United States Patent [19]

Young

[11] Patent Number: 5,433,460
[45] Date of Patent: Jul. 18, 1995

[54] BOAT DOLLY APPARATUS

[76] Inventor: Richard W. Young, 2665 W. Crescent Ave., Anaheim, Calif. 92801-4902

[21] Appl. No.: 216,465

[22] Filed: Mar. 23, 1994

[51] Int. Cl.[6] .............................................. B62B 1/26
[52] U.S. Cl. .................................. 280/35; 280/47.331; 280/79.7
[58] Field of Search ..................... 280/35, 47.11, 47.18, 280/47.24, 47.331, 414.1, 414.2, DIG. 11, 79.7; 269/17; 248/129, 274; 114/344

[56] References Cited

U.S. PATENT DOCUMENTS

| | | |
|---|---|---|
| 4,059,282 | 11/1977 | Prickett . |
| 4,214,774 | 7/1980 | Kluge . |
| 4,392,665 | 7/1983 | Miller et al. . |
| 4,550,925 | 11/1985 | McDonough . |
| 4,602,802 | 7/1986 | Morgan ........................ 280/47.331 |
| 4,603,872 | 8/1986 | White ............................ 280/47.331 |
| 5,000,468 | 3/1991 | Weinstein . |
| 5,203,580 | 4/1993 | Cunningham ................. 280/47.331 |
| 5,299,659 | 4/1994 | Imbeault et al. .............. 280/79.7 X |

FOREIGN PATENT DOCUMENTS 2515605  5/1983  France ............................ 280/47.331

Primary Examiner—Brian L. Johnson

[57] ABSTRACT

A boat dolly apparatus includes a first base assembly which includes a first end portion and a second end portion. A first wheel assembly is connected to the first end portion of the first base assembly, and a second wheel assembly is connected to the second end portion of the first base assembly. A second base assembly is connected to the first end portion of the first base assembly. A clamping assembly is connected to the second base assembly for connecting the second base assembly to a boat, and a post assembly is connected to the second end portion of the first base assembly. The second base assembly is connected to the first base assembly at a right angle. The first base assembly and the second base assembly are contiguous to a first plane and are in the shape of a letter T. The first base assembly includes a first adjustable member connected to the first wheel assembly and a second adjustable member connected to the second wheel assembly. The first adjustable member and the second adjustable member are mutually adjustable longitudinally between the first wheel assembly and the second wheel assembly, such that the first base assembly is capable of being adjusted to a predetermined adjusted length. The post assembly is connected to the first base assembly at a right angle. A flexible connector assembly is adapted for connecting between the post assembly and a side of a boat.

18 Claims, 4 Drawing Sheets

BOAT DOLLY APPARATUS

BACKGROUND OF THE INVENTION

1. Field of the Invention

The present invention relates generally to devices for transporting boats and, more particularly, to dollies especially adapted for transporting a small boat to and from a launch area.

2. Description of the Prior Art

Many people own and operate their own boats for recreation and leisure. When a boat is not in use, it must be stored somewhere. For a large boat, a berth at a dock may be employed. However, for a small boat, a berth at a dock is not practical and would be excessively costly. Often, a small boat is stored at a user's residence, and the small boat is transported to a body of water when the boat is to be used.

Two common modes of transport are used for small boats. In one mode of transport, a trailer is pulled behind a motor vehicle, and the small boat is placed on the trailer. In another mode of transport, the small boat is carried directly on the motor vehicle. For example, the small boat may be placed on a roof rack.

An advantage of using a boat trailer is that the trailer can be backed into the water for easy launching of the small boat. A number of disadvantages, however, are associated with the use of a boat trailer. For example, a boat trailer can be quite ,expensive. Also, a boat trailer must be stored when it is not in use. In addition, when a trailer is pulled by a motor vehicle, the driver of the motor vehicle must have skills that the driver may not ordinarily have. For example, the driver of the motor vehicle must have skill in making turns with the trailer. The driver of the motor vehicle must have skill in backing up with a trailer. In fact, however, many drivers are not used to trailer towing and are not skilled in making turns with a trailer and are not skilled in backing up with a trailer.

When a boat is carried directly by the motor vehicle, one problem occurs. That is, without having the small boat on some form of wheeled carriage, it may be difficult to launch the boat in the water. To solve this problem, throughout the years, a number of innovations have been developed relating to wheeled devices or dollies which enable a user to wheel a small boat to a body of water and to launch the small boat in the body of water. The following U.S. Pat. Nos. are representative of some of those innovations: 4,059,282; 4,214,774; 4,392,665; 4,550,925; and 5,000,468.

More specifically, U.S. Pat. No. 4,059,282 discloses a boat dolly that attached to the bow of a boat placed in an upside orientation. Two disadvantages are associated with the use of this device. First, the boat must be turned upside down when this device is used. Second, the bow area of the boat is relatively narrow compared to the remainder of the boat. As a result, it may be difficult to balance the boat on the wheels placed at the bow. The difficulty in balancing the entire weight of the boat on the narrow bow may be likened to balancing the weight of a wheel barrow and its contents on the one wheel of the wheel barrow. Wheel barrows are highly susceptible to tipping over as would be a boat supported on a bow wheel.

U.S. Pat. No. 4,214,774 discloses a two-wheeled boat carrier and launcher that: employs a very long handle used by a user for controlling motion of a small boat on the carrier. Such a long handle must be assembled for use and disassembled when not in use for convenient storage. Moreover, the handle also serves as a slender longitudinal support for the small boat on the carriage. Such a slender longitudinal support places the boat in a position of being susceptible to tipping over, especially on rough terrain between the motor vehicle and the body of water. In this respect, it would be desirable if a device for transporting a small boat from a motor vehicle to a body of water did not employ a very long handle that serves as a longitudinal support for the boat.

U.S. Pat. No. 4,392,665 discloses a boat dolly that employs ropes for launching a boat when the boat is oriented on its bottom on the dolly. A plurality of ropes has a well-known tendency to form undesirable knots together. In this respect, it would be desirable if a boat dolly device were provided that does not employ a plurality of ropes that can become knotted to each other.

U.S. Pat. No. 4,550,925 discloses a boat dolly that is adapted to be secured to a center skeg which connects a right hull portion to a left hull portion of a multihull boat. This device is not adaptable to a single hull boat.

U.S. Pat. No. 5,000,468 discloses a boat dolly in a laterally vertical orientation. The device has a pair of spaced frame member which form a pocket or cradle for holding the boat. In addition, the dolly has a stabilizing bar for engaging the topmost beam of the boat or to which an elastic member is attached for securing the topmost beam. One disadvantage associated with this device is that the pair of spaced frame members are quite long and take up considerable storage space when the device is not in use. Another disadvantage associated with the use of this device is that the device is not provided with clamping elements to clamp the boat to the device. Without clamping elements for clamping the boat to the dolly, the boat may bounce around on the dolly, especially when the dolly traverses rough terrain.

Still other features would be desirable in a boat dolly apparatus. For example, it would be desirable if a boat dolly device can be readily attached to a small boat and be left on the boat when the boat is being transported by a motor vehicle. Also, it would be desirable if a boat dolly device facilitated storage of a small boat in an orientation wherein the boat is resting on one side. In this orientation, the boat takes up much less floor space than when a small boat is stored on its bottom, or upside down on its top.

Small boats come in many sizes, and it would be desirable if a boat dolly device were :adjustable to fit a wide variety of sizes of small boats.

Thus, while the foregoing body of prior art indicates it to be well known to use boat dolly devices, the prior art described above does not teach or suggest a boat dolly apparatus which has the following combination of desirable features: (1) does not require a boat trailer that must be pulled by a motor vehicle; (2) does not require a boat trailer must be stored when it is not in use; (3) does not require a driver of a motor vehicle to be skilled in making turns with a trailer and to be skilled in backing up with a trailer; (4) does not require a boat to be turned upside down when the device is used; (5) avoids the difficulty of balancing a boat on wheels placed at the bow of the boat; (6) does not employ a long handle that serves as a longitudinal support for the boat; (7) does not employ a plurality of ropes that can readily become knotted to each other; (8) is adaptable to a boat which has a single hull; (9) provides clamping elements to clamp the boat to the device; (10) can be readily attached to a small boat and can be left on the boat when the boat is being transported by a motor vehicle; (11) facilitates storage of a small boat in an orientation wherein the boat is resting on one side; and (12) is adjustable to fit a wide variety of sizes of small boats. The foregoing desired characteristics are provided by the unique boat dolly apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved boat dolly apparatus which includes a first base assembly which includes a first end portion and a second end portion. A first wheel assembly is connected to the first end portion of the first base assembly, and a second wheel assembly is connected to the second end portion of the first base assembly. A second base assembly is connected to the first end portion of the first base assembly. A clamping assembly is connected to the second base assembly for connecting the second base assembly to a boat, and a post assembly is connected to the second end portion of the first base assembly. The second base assembly is connected to the first base assembly at a right angle. The first base assembly and the second base assembly are contiguous to a first plane.

The first base assembly includes a first adjustable member connected to the first wheel assembly and a second adjustable member connected to the second wheel assembly. The first adjustable member and the second adjustable member are mutually adjustable longitudinally between the first wheel assembly and the second wheel assembly, such that the first base assembly is capable of being adjusted to a predetermined adjusted length. The first adjustable member is connected to the second base assembly which is connected to the first wheel assembly. The first adjustable member is a first telescopic member, and the second adjustable member is a second telescopic member.

A locking assembly is placed in registration with the first adjustable member and the second adjustable member for locking the first adjustable member and the second adjustable member in a predetermined adjusted length.

The clamping assembly includes a base plate member connected to the second base assembly. A first adjustable bracket is adjustably connected to the base plate member. A first bracket locking assembly is connected to the base plate member in registration with the first adjustable bracket for locking the first adjustable bracket with respect to the base plate member at a selected adjustment. The first adjustable bracket includes an adjustable connecting portion for adjustably connecting the first adjustable bracket to the base plate member. A first clamping portion is connected to the adjustable connecting portion. The adjustable connecting portion of the first adjustable bracket includes slots which are placed in registration with the first bracket locking assembly. The first clamping portion of the first adjustable bracket is oriented with respect to the adjustable connecting portion of the first adjustable bracket at a right angle.

A second adjustable bracket is adjustably connected to the first clamping portion of the first adjustable bracket. A second bracket locking assembly is connected to the first clamping portion in registration with the second adjustable bracket for locking the second adjustable bracket with respect to the first clamping portion of the first adjustable bracket at a selected adjustment. The second adjustable bracket includes an adjustable connecting portion for adjustably connecting the second adjustable bracket to the first clamping portion of the first adjustable bracket. A second clamping portion is connected to the adjustable connecting portion of the second adjustable bracket.

The post assembly is connected to the first base assembly at a right angle. The adjustable connecting portion of the second adjustable bracket includes slots which are placed in registration with the second bracket locking assembly. The second bracket locking assembly includes threaded bolts and complementarily threaded receiving channels in the first clamping portion. The threaded bolts are placed through the slots. The post assembly and the first base assembly are contiguous to a second plane.

A flexible connector assembly is adapted for connecting between the post assembly and a side of a boat. The flexible connector assembly is elastic such as commonly used on trucks and roof racks.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved boat dolly apparatus which has all of the advantages of the prior art and none of the disadvantages.

It is another object of the present invention to provide a new and improved boat dolly apparatus which may be easily and efficiently manufactured and marketed.

It is a further object of the present invention to provide a new and improved boat dolly apparatus which is of durable and reliable construction.

An even further object of the present invention is to provide a new and improved boat dolly apparatus which is susceptible of a low cost of manufacture with regard to both materials and labor, and which accordingly is then susceptible of low prices, of sale to the consuming public, thereby making such boat dolly apparatus available to the buying public.

Still yet a further object of the present invention is to provide a new and improved boat dolly apparatus which does not require a boat trailer that must be pulled by a motor vehicle.

Still another object of the present invention is to provide a new and improved boat dolly apparatus that does not require a boat trailer which must be stored when it is not in use.

Yet another object of the present invention is to provide a new and improved boat dolly apparatus which does not require a driver of a motor vehicle to be skilled in making turns with a trailer and to be skilled in backing up with a trailer.

Even another object of the present invention is to provide a new and improved boat dolly apparatus that does not require a boat to be turned upside down when the device is used.

Still a further object of the present invention is to provide a new and improved boat dolly apparatus which avoids the difficulty of balancing a boat on wheels placed at the bow of the boat.

Yet another object of the present invention is to provide a new and improved boat dolly apparatus that does not employ a long handle that serves as a longitudinal support for the boat.

Still another object of the present invention is to provide a new and improved boat dolly apparatus which does not employ a plurality of ropes that can readily become knotted to each other.

Yet another object of the present invention is to provide a new and improved boat dolly apparatus that is adaptable to a boat which has a single hull.

Still a further object of the present invention is to provide a new and improved boat dolly apparatus that provides clamping elements to clamp the boat to the device.

Yet another object of the present invention is to provide a new and improved boat dolly apparatus which can be readily attached to a small boat and can be left on the boat when the boat is being transported by a motor vehicle.

Still a further object of the present invention is to provide a new and improved boat dolly apparatus that facilitates storage of a small boat in an orientation wherein the boat is resting on one side.

Yet another object of the present invention is to provide a new and improved boat dolly apparatus which is adjustable to fit a wide variety of sizes of small boats.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
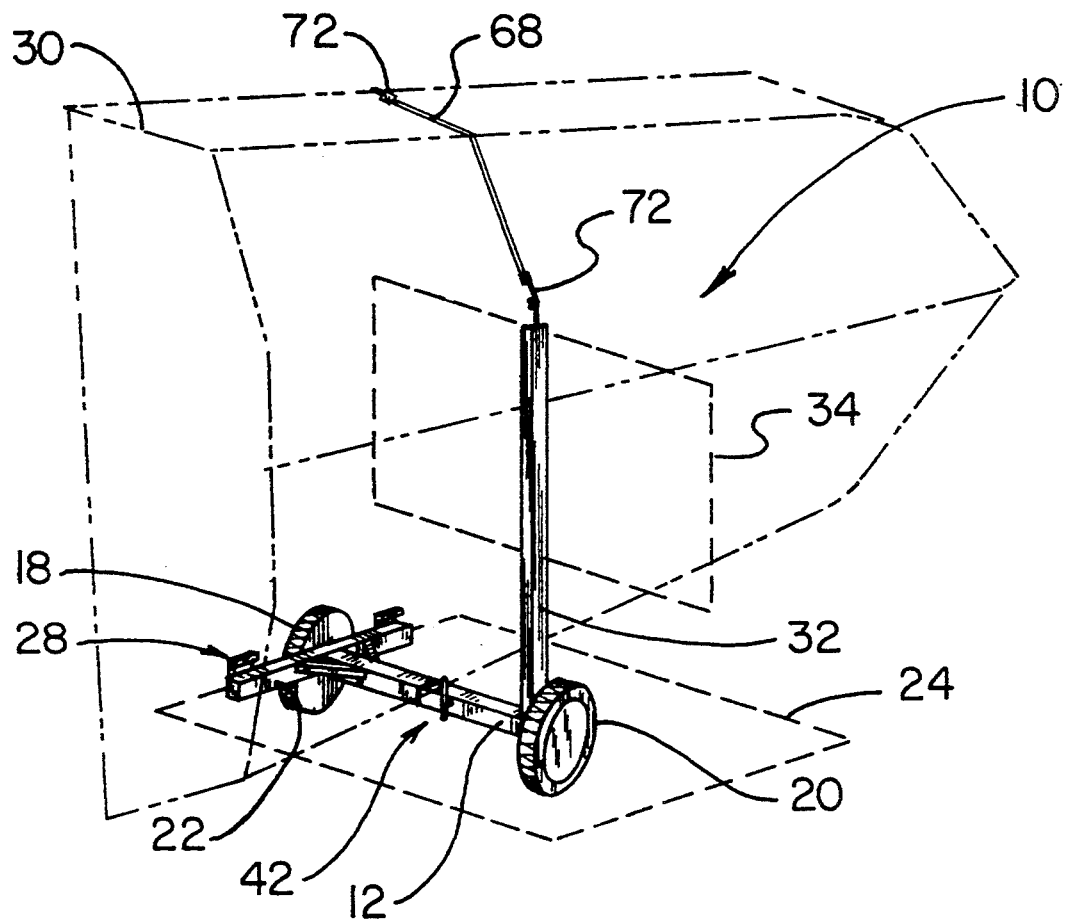
FIG. 1 is a perspective view showing a preferred embodiment of the boat dolly apparatus of the invention installed on a small boat resting on one of its sides.
Figure 2:
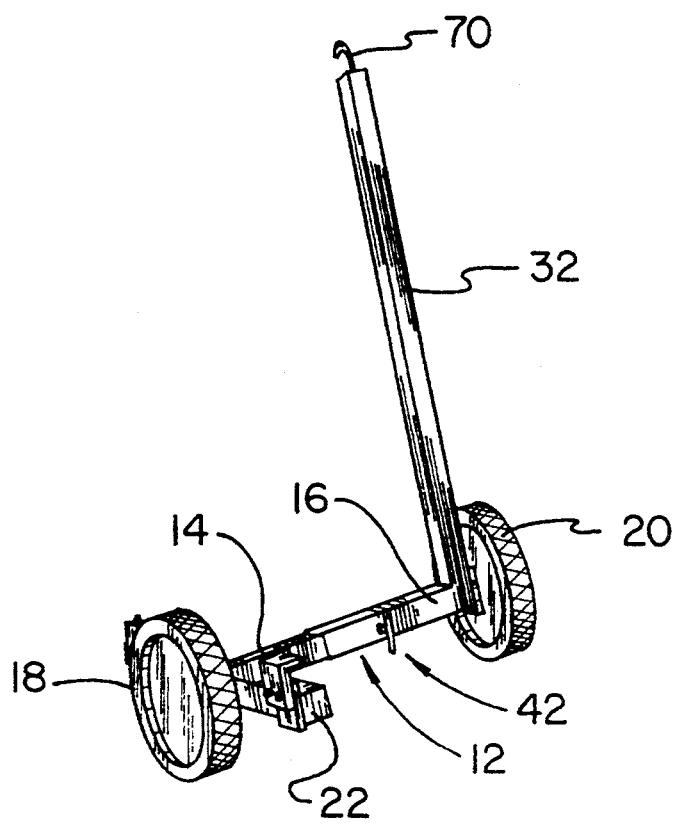
FIG. 2 is an enlarged perspective view of the embodiment of the boat dolly apparatus shown in FIG. 1 with the small boat removed from the apparatus.

With reference to the drawings, a new and improved boat dolly apparatus embodying the principles and concepts of the present invention will be described.

Turning to FIGS. 1-7, there is shown an exemplary embodiment of the boat dolly apparatus of the invention generally designated by reference numeral 10. In its preferred form, boat dolly apparatus 10 includes a first base assembly 12 which includes a first end portion 14 and a second end portion 16. A first wheel assembly 18 is connected to the first end portion 14 of the first base assembly 12, and a second wheel assembly 20 is connected to the second end portion 16 of the first base assembly 12. A second base assembly 22 is connected to the first end portion 14 of the first base assembly 12. A clamping assembly 28 is connected to the second base assembly 22 for connecting the second base assembly 22 to a boat 30, and a post assembly 32 is connected to the second end portion 16 of the first base assembly 12. The second base assembly 22 is connected to the first base assembly 12 at a right angle. The first base assembly 12 and the second base assembly 22, are contiguous to a first plane 24. A midportion 26 of the second base assembly 22 is connected to the first base assembly 12.

Figure 3:
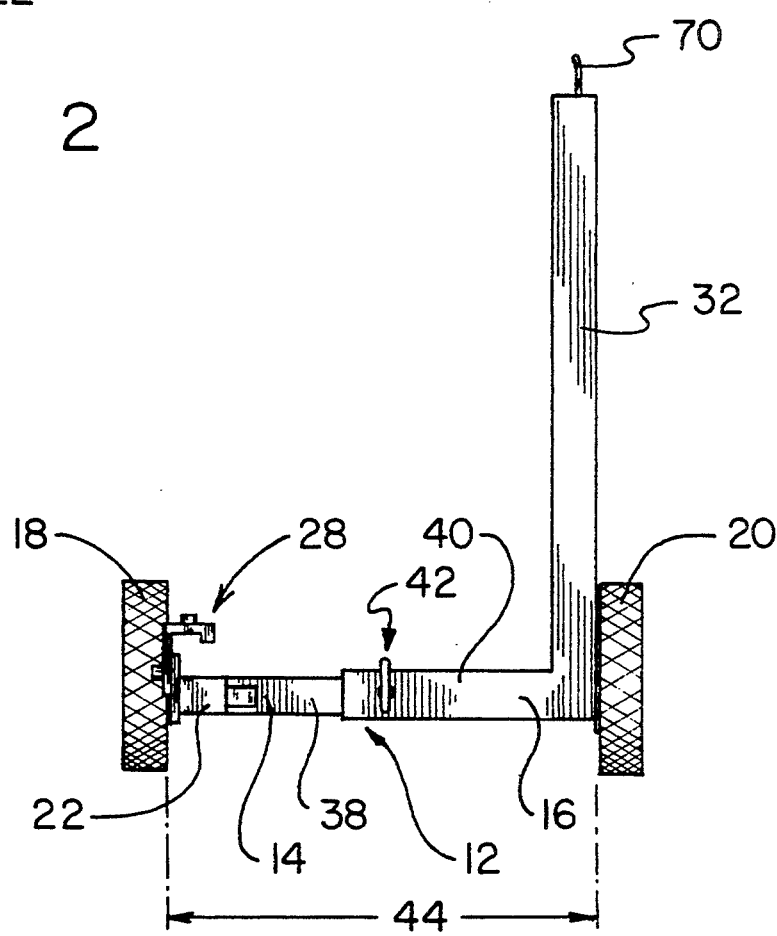
FIG. 3 is an enlarged front view of the embodiment of the invention shown in FIG. 2.
Figure 4:
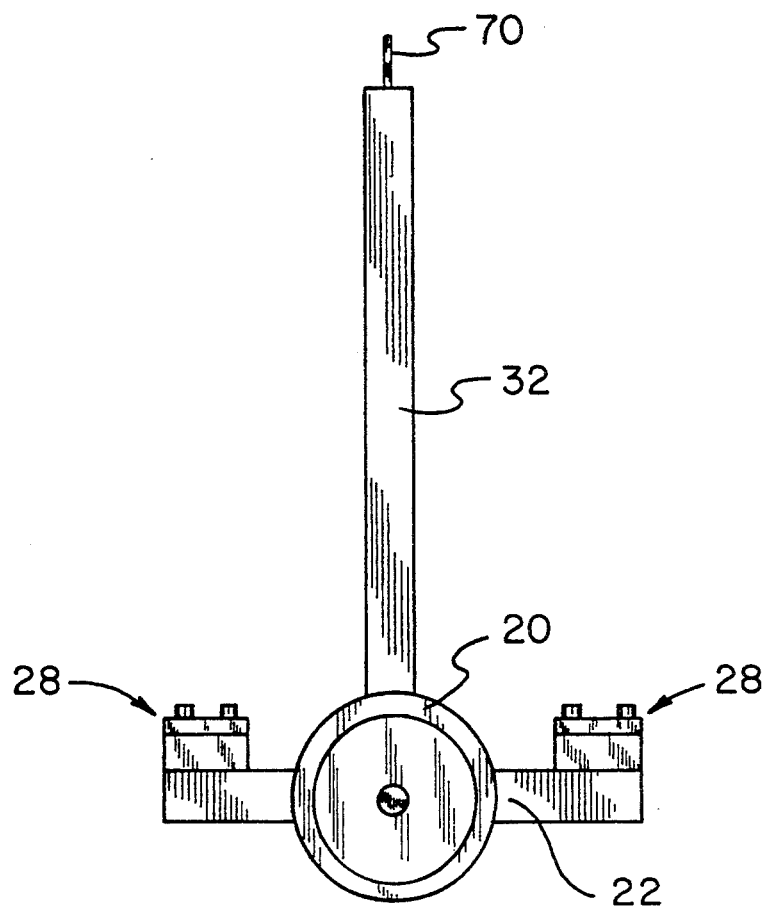
FIG. 4 is an enlarged side view of the embodiment of the invention shown in FIG. 3.
Figure 5:
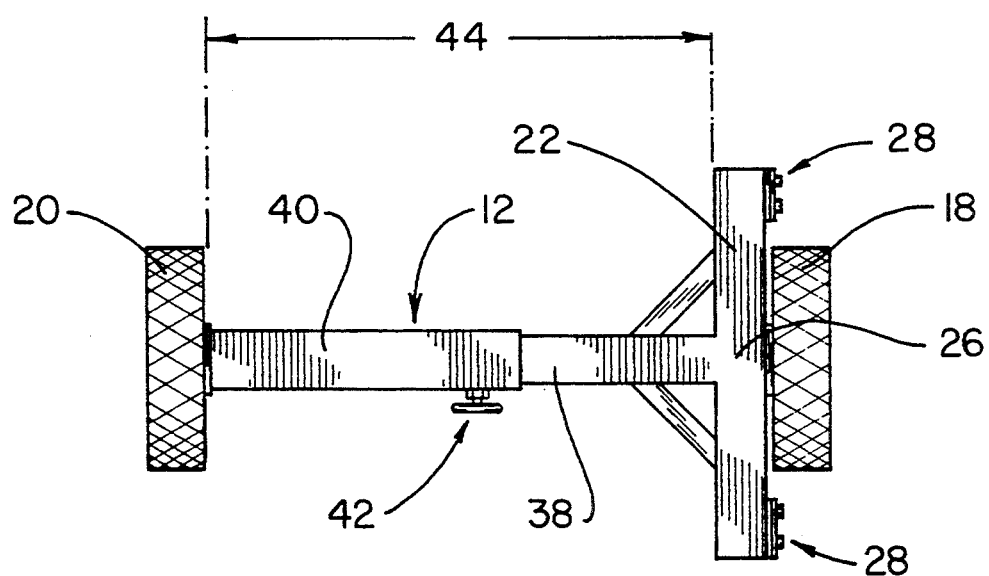
FIG. 5 is an enlarged bottom view of the embodiment of the invention shown in FIG. 4.

As shown in greatest detail in FIGS. 3 and 5, the first base assembly 12 includes a first adjustable member 38 connected to the first wheel assembly 18 and a second adjustable member 40 connected to the second wheel assembly 20. The first adjustable member 38 and the second adjustable member 40 are mutually adjustable longitudinally between the first wheel assembly 18 and the second wheel assembly 20, such that the first base assembly 12 is capable of being adjusted to a predetermined adjusted length 44. The first adjustable member 38 is connected to the second base assembly 22 which is connected to the first wheel assembly 18. The first adjustable member 38 is a first telescopic member 38, and the second adjustable member 40 is a second telescopic member 40.

A locking assembly 42 is placed in registration with the first adjustable member 38 and the second adjustable member 40 for locking the first adjustable member 38 and the second adjustable member 40 in a predetermined adjusted length 44.

Figure 6:
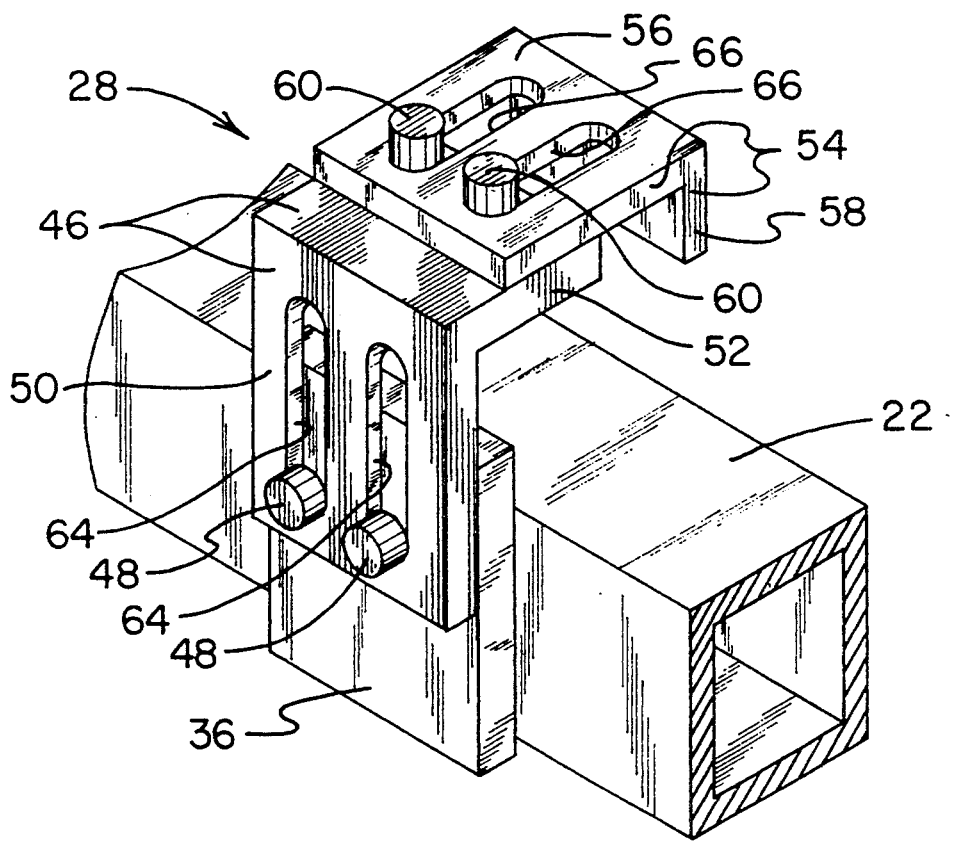
FIG. 6 is an enlarged perspective view of the boat clamping assembly shown in the embodiment of the invention shown in FIGS. 1-5.
Figure 7:
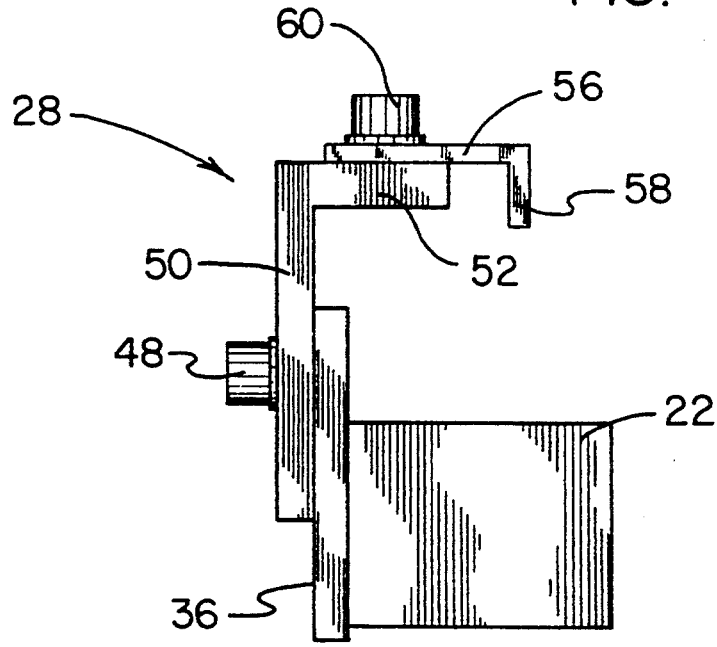
FIG. 7 is a side view of the boat clamping assembly shown in FIG. 6.

As shown in greatest detail in FIGS. 6 and 7, a clamping assembly 28 includes a base plate member 36 connected to the second base assembly 22. A first adjustable bracket 46 is adjustably connected to the base plate member 36. A first bracket locking assembly 48 is connected to the base plate member 36 in registration with the first adjustable bracket 46 for locking the first adjustable bracket 46 with respect to the base plate member 36 at a selected adjustment. The first adjustable bracket 46 includes an adjustable connecting portion 50 for adjustably connecting the first adjustable bracket 46 to the base plate member 36. A first clamping portion 52 is connected to the adjustable connecting portion 50. The adjustable connecting portion 50 of the first adjustable bracket 46 includes slots 64 which are placed in registration with the first bracket locking assembly 48. The first bracket locking assembly 48 includes threaded bolts and complementarily threaded receiving channels in the base plate member 36. The threaded bolts are placed through the slots 64. The first clamping portion 52 of the first adjustable bracket 46 is oriented with respect to the adjustable connecting portion 50 of the first adjustable bracket 46 at a right angle.

A second adjustable bracket 54 is adjustably connected to the first clamping portion 52 of the first adjustable bracket 46. A second bracket locking assembly 60 is connected to the first clamping portion 52 in registration with the second adjustable bracket 54 for locking the second adjustable bracket 54 with respect to the first clamping portion 52 of the first adjustable bracket 46 at a selected adjustment. The second adjustable bracket 54 includes an adjustable connecting portion 56 for adjustably connecting the second adjustable bracket 54 to the first clamping portion 52 of the first adjustable bracket 46. A second clamping portion 58 is connected to the adjustable connecting portion 56 of the second adjustable bracket 54. The second clamping portion 58 of the second adjustable bracket 54 is oriented with respect to the adjustable connecting portion 56 of the second adjustable bracket 54 at a right angle.

The post assembly 32 is connected to the first base assembly 12 at a right angle. The adjustable connecting portion 56 of the second adjustable bracket 54 includes slots 66 which are placed in registration with the second bracket locking assembly 60. The second bracket locking assembly 60 includes threaded bolts and complementarily threaded receiving channels in the first clamping portion 52. The threaded bolts are placed through the slots 66. The post assembly 32 and the first base assembly 12 are contiguous to a second plane 34.

A flexible connector assembly 68 is adapted for connecting between the post assembly 32 and a side of a boat 30. The flexible connector assembly 68 includes two hooks 72, one at each end of the flexible connector assembly 68. The post assembly 32 includes a hook 70 adapted for connecting to the flexible connector assembly 68. The flexible connector assembly 68 is elastic such as commonly used on trucks and roof racks.

In using a boat dolly apparatus of the invention, the apparatus is attached to a side of a boat 30, as shown in FIG. 1. More specifically, a pair of clamping assemblies 28 is attached to the side rim of a small boat 30. To do this, the first bracket locking assembly 48 and the second bracket locking assembly 60 are loosened so that the first adjustable bracket 46 can be adjusted and the second adjustable bracket 54 can be adjusted. When both the first adjustable bracket 46 and the second adjustable bracket 54 are properly adjusted, they fit over a side rim of the boat 30. Then the first bracket locking assembly 48 and the second bracket locking assembly 60 are tightened to clamp the first adjustable bracket 46 and the second adjustable bracket 54 onto the side rim of the boat 30. The slots 64 and 66 permit the first adjustable bracket 46 and the second adjustable bracket 54 to be adjusted for a wide variety of thicknesses of the side rim of the boat 30.

Furthermore, the locking assembly 42 of the first base assembly 12 is loosened, and the adjusted length 44 of the first base assembly 12 is adjusted by moving the first adjustable member 38 and the second adjustable member 40 of the first base, assembly 12. The adjustment of the adjusted length 44 of the first base assembly 12 is provided so that the clamping assemblies 28 remain clamped onto the side rim of the boat 30, and the post assembly 32 is in contact with a bottom portion of the boat 30. Then, the flexible connector assembly 68 is connected between the post assembly 32 and an opposite side rim of the boat 30 by connecting one of the hooks 72 of the flexible connector assembly 68 to the opposite side rim of the boat 30 and the other of the hooks 72 to the hook 70 on the post assembly 32.

The boat dolly apparatus 10 of the invention can be left on the boat 30 as the boat 30 is transported by a motor vehicle to a launching area. When the launching area is reached, the boat 30 with the attached boat dolly apparatus of the invention is taken off the motor vehicle. The boat 30 is positioned on the ground so that the first wheel assembly 18 and the second wheel assembly 20 are capable of rolling on the ground when the bow end of the boat is lifted and pushed or pulled. The boat 30 is positioned between the first wheel assembly 18 and the second wheel assembly 20 in a stable orientation. The boat 30 rolls along the terrain on the wheels 18 and 20 when the bow of the boat 30 is pushed or pulled by a user. It is noted that the boat 30 can be rolled to a storage location and stored in the side orientation as it remains on the boat dolly apparatus of the invention.

Once the launch site is reached, the boat 30 can be tipped over so that it has its bottom side down, and the boat dolly apparatus of the invention can be detached from the boat 30. This is done by loosening the first bracket locking assembly 48 and the second bracket locking assembly 60 and moving the first clamping portion 52 and the second clamping portion 58 out of clamping engagement with the side rim of the boat 30. The flexible connector assembly 68 is also disconnected from the other side rim of the boat 30 and the hook 70 of the post assembly 32.

The components of the boat dolly apparatus of the invention can be made from inexpensive and durable metal and plastic materials. The first base assembly 12, the second base assembly 22, and the post assembly 32 can be made from steel mechanical tubing. The first wheel assembly 18 and the second wheel assembly 20 can be made from PVC plastic.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved boat dolly apparatus that is low in cost, relatively simple in design and operation, and which may advantageously be used without requiring a boat trailer that must be pulled by a motor vehicle. With the invention, a boat dolly apparatus is provided which does not require a boat trailer that must be stored when it is not in use. With the invention, a boat dolly apparatus is provided which does not require a driver of a motor vehicle to be skilled in making turns with a trailer and to be skilled in backing up with a trailer. With the invention, a boat dolly apparatus is provided which does not require a boat to be turned upside down when the device is used. With the invention, a boat dolly apparatus is provided which avoids the difficulty of balancing a boat on wheels placed at the bow of the boat. With the invention, a boat dolly apparatus is provided which does not employ a long handle that serves as a longitudinal support for the boat.

With the invention, a boat dolly apparatus is provided which does not employ a plurality of ropes that can readily become knotted to each other. With the invention, a boat dolly apparatus is provided which is adaptable to a boat which has a single hull. With the invention, a boat dolly apparatus is provided which provides clamping elements to clamp the boat to the device. With the invention, a boat dolly apparatus is provided which can be readily attached to a small boat and can be left on the boat when the boat is being transported by a motor vehicle. With the invention, a boat dolly apparatus is provided which facilitates storage of a small boat in an orientation wherein the boat is resting on one side. With the invention, a boat dolly apparatus is provided which is adjustable to fit a wide variety of sizes of small boats.

With respect to the above description, it should be realized that the optimum dimensional relationships for the parts of the invention, to include variations in size, form function and manner of operation, assembly and use, are deemed readily apparent and obvious to those skilled in the art, and therefore, all relationships; equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by letters patent of the United States is as follows:

1. A boat dolly apparatus, comprising:
    a first base assembly which includes a first end portion and a second end portion,
    a first wheel assembly connected to said first end portion of said first base assembly,
    a second wheel assembly connected to said second end portion of said first base assembly,
    a second base assembly connected to said first end portion of said first base assembly,
    a clamping assembly, connected to said second base assembly, for connecting said second base assembly to a boat, wherein said clamping assembly includes a base plate member connected to said second base assembly, a first adjustable bracket adjustably connected to said base plate member, and a first bracket locking assembly connected to said base plate member in registration with said first adjustable bracket for locking said first adjustable bracket with respect to said base plate member at a selected adjustment, and wherein said first adjustable bracket includes an adjustable connecting portion for adjustably connecting said first adjustable bracket to said base plate member, and a first clamping portion connected to said adjustable connecting portion, and
    a post assembly connected to said second end portion of said first base assembly.

2. The apparatus described in claim 1 wherein said second base assembly is connected to said first base assembly at a right angle.

3. The apparatus described in claim 1 wherein said first base assembly and said second base assembly are contiguous to a first plane.

4. The apparatus described in claim 1 wherein said first base assembly includes:
    a first adjustable member connected to said first wheel assembly, and
    a second adjustable member connected to said second wheel assembly, wherein said first adjustable member and said second adjustable member are mutually adjustable longitudinally between said first wheel assembly and said second wheel assembly, such that said first base assembly is capable of being adjusted to a predetermined adjusted length.

5. The apparatus described in claim 4 wherein said first adjustable member is connected to said second base assembly which is connected to said first wheel assembly.

6. The apparatus described in claim 4 wherein:
    said first adjustable member is a first telescopic member, and
    said second adjustable member is a second telescopic member.

7. The apparatus described in claim 4, further including:
    a locking assembly placed in registration with said first adjustable member and said second adjustable member for locking said first adjustable member and said second adjustable member in a predetermined adjusted length.

8. The apparatus described in claim 1 wherein said adjustable connecting portion of said first adjustable bracket includes slots which are placed in registration with said first bracket locking assembly.

9. The apparatus described in claim 1 wherein said first clamping portion of said first adjustable bracket is oriented with respect to said adjustable connecting portion of said first adjustable bracket, at a right angle.

10. The apparatus described in claim 1, further including:
    a flexible connector assembly adapted for connecting between said post assembly and a side of a boat.

11. The apparatus described in claim 10 wherein said flexible connector assembly is elastic.

12. The apparatus described in claim 1 wherein said post assembly is connected to said first base assembly at a right angle.

13. The apparatus described in claim 3 wherein said post assembly and said first base assembly, are contiguous to a second plane.

14. A boat dolly apparatus, comprising:
a first base assembly which includes a first end portion and a second end portion,
a first wheel assembly connected to said first end portion of said first base assembly,
a second wheel assembly connected to second end portion of said first base assembly,
a second base assembly connected to said first end portion of said first base assembly,
a clamping assembly, connected to said second base assembly, for connecting said second base assembly to a boat, wherein said clamping assembly includes a base plate member connected to said second base assembly, a first adjustable bracket adjustably connected to said base plate member, and a first bracket locking assembly connected to said base plate member in registration with said first adjustable bracket for locking said first adjustable bracket with respect to said base plate member at a selected adjustment, and wherein said first adjustable bracket includes an adjustable connecting portion for adjustably connecting said first adjustable bracket to said base plate member and a first clamping portion connected to said adjustable connecting portion,
a post assembly connected to said second end portion of said first base assembly,
a second adjustable bracket adjustably connected to said first clamping portion of said first adjustable bracket, and
a second bracket locking assembly connected to said first clamping portion in registration with said second adjustable bracket for locking said second adjustable bracket with respect to said first clamping portion of said first adjustable bracket at a selected adjustment.

15. The apparatus described in claim 14 wherein said second adjustable bracket includes:
an adjustable connecting portion for adjustably connecting said second adjustable bracket to said first clamping portion of said first adjustable bracket, and
a second clamping portion connected to said adjustable connecting portion of said second adjustable bracket.

16. The apparatus described in claim 15 wherein said adjustable connecting portion of said second adjustable bracket includes slots which are placed in registration with said second bracket locking assembly.

17. The apparatus described in claim 16 wherein said second bracket locking assembly includes threaded bolts and complementarily threaded receiving channels in said first clamping portion.

18. The apparatus described in claim 17 wherein said threaded bolts are placed through said slots.

* * * * *